US012684470B2

(12) United States Patent　　(10) Patent No.:　US 12,684,470 B2
Jiang　　(45) Date of Patent:　Jul. 14, 2026

(54) METHOD AND DEVICE FOR COMMUNICATION PROCESSING

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 375 days.

(21) Appl. No.: 17/910,268

(22) PCT Filed: Mar. 9, 2020

(86) PCT No.: PCT/CN2020/078456
§ 371 (c)(1),
(2) Date: Sep. 8, 2022

(87) PCT Pub. No.: WO2021/179130
PCT Pub. Date: Sep. 16, 2021

(65) Prior Publication Data
US 2023/0094982 A1　　Mar. 30, 2023

(51) Int. Cl.
*H04W 48/18*　　(2009.01)
*H04W 74/00*　　(2009.01)
*H04W 74/0833*　　(2024.01)

(52) U.S. Cl.
CPC ......... *H04W 48/18* (2013.01); *H04W 74/006* (2013.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 2017/0367120 A1* | 12/2017 | Murray | ............. | H04W 74/0833 |
| 2019/0110300 A1* | 4/2019 | Chen | ......................... | H04B 7/00 |
| 2019/0289534 A1* | 9/2019 | Ryoo | .................... | H04W 48/18 |
| 2019/0313459 A1 | 10/2019 | Zhang et al. | | |
| 2019/0364495 A1* | 11/2019 | Mildh | ................... | H04W 48/18 |
| 2021/0068073 A1* | 3/2021 | Sivavakeesar | .... | H04W 74/0833 |

(Continued)

FOREIGN PATENT DOCUMENTS

| | | |
|---|---|---|
| CN | 101128028 A | 2/2008 |
| CN | 101212791 A | 7/2008 |

(Continued)

OTHER PUBLICATIONS

Khodapanah et al., "Radio Resource Management in context of Network Slicing: What is Missing in Existing Mechanisms?" 2019 IEEE Wireless Communications and Networking Conference (WCNC), Oct. 31, 2019 (Year: 2019).*

(Continued)

*Primary Examiner* — Gregory B Sefcheck
*Assistant Examiner* — Benjamin Peter Welte
(74) *Attorney, Agent, or Firm* — Cozen O'Connor

(57) ABSTRACT

Disclosed are a communication processing method and apparatus. The method includes: receiving first random access configuration information for different access categories; and performing random access, on the basis of the first random-access configuration information of an access category for which a random access is triggered, on a random access resource of the access type for which the random access is triggered.

10 Claims, 7 Drawing Sheets receiving first random access configuration information for different access categories　　S11 performing a random access on a random access resource of an access category for which a random access is triggered based on the first random access configuration information for the access category for which the random access is triggered　　S12

(56)                    References Cited

U.S. PATENT DOCUMENTS

| 2022/0353908 A1* | 11/2022 | Li | H04W 48/18 |
| 2023/0029004 A1* | 1/2023 | Gao | H04W 48/12 |
| 2023/0156583 A1* | 5/2023 | Murray | H04W 48/18 |

FOREIGN PATENT DOCUMENTS

| CN | 106851589 A | 6/2017 |
| CN | 107734690 A | 2/2018 |
| CN | 108633101 A | 10/2018 |
| EP | 3343980 A1 | 7/2018 |
| EP | 3512272 A1 | 7/2019 |

OTHER PUBLICATIONS

Qualcomm, "R1-1805701: Summary of remaining details on RACH Procedure", 3GPP TSG-RAN WG1 92bis, Apr. 20, 2018 (Year: 2018).*

Chinese Patent Application No. 202080000496.6, Office Action dated Dec. 12, 2023, 33 pages.

Chinese Patent Application No. 202080000496.6, English translation of Office Action dated Dec. 12, 2023, 56 pages.

Chinese Patent Application No. 202080000496.6, Office Action dated Jul. 28, 2023, 21 pages.

Chinese Patent Application No. 202080000496.6, English translation of Office Action dated Jul. 28, 2023, 39 pages.

European Patent Application No. 20924420.1, Search and Opinion dated Oct. 10, 2023, 8 pages.

PCT/CN2020/078456 English translation of International Search Report dated Dec. 8, 2020, 3 pages.

* cited by examiner receiving first random access configuration information for different access categories          S11 performing a random access on a random access resource of an access category for which a random access is triggered based on the first random access configuration information for the access category for which the random access is triggered          S12

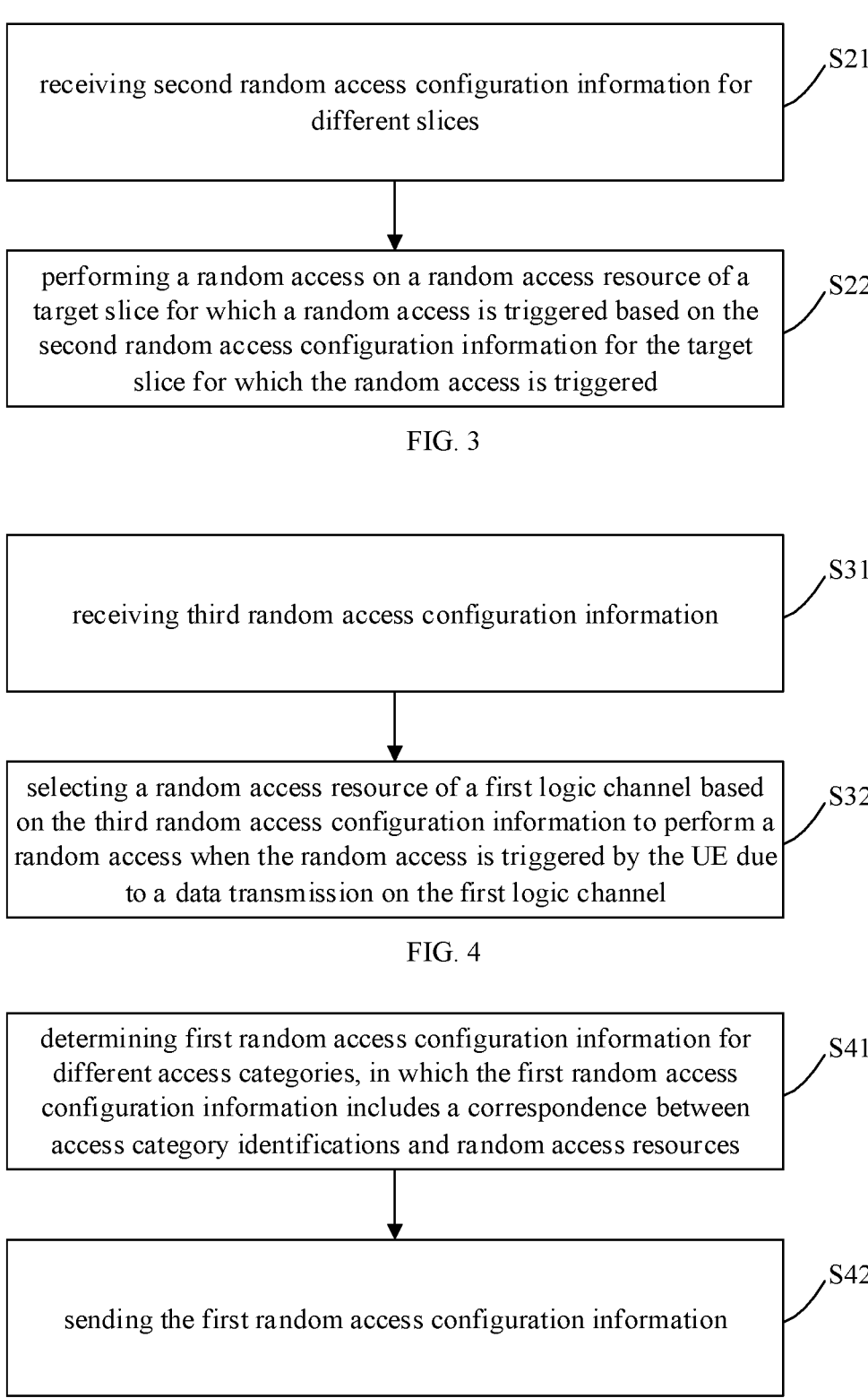

receiving second random access configuration information for different slices                    ⟋S21 performing a random access on a random access resource of a target slice for which a random access is triggered based on the second random access configuration information for the target slice for which the random access is triggered                    ⟋S22

FIG. 3 receiving third random access configuration information                    ⟋S31 selecting a random access resource of a first logic channel based on the third random access configuration information to perform a random access when the random access is triggered by the UE due to a data transmission on the first logic channel                    ⟋S32

FIG. 4 determining first random access configuration information for different access categories, in which the first random access configuration information includes a correspondence between access category identifications and random access resources                    ⟋S41 sending the first random access configuration information                    ⟋S42

FIG. 5

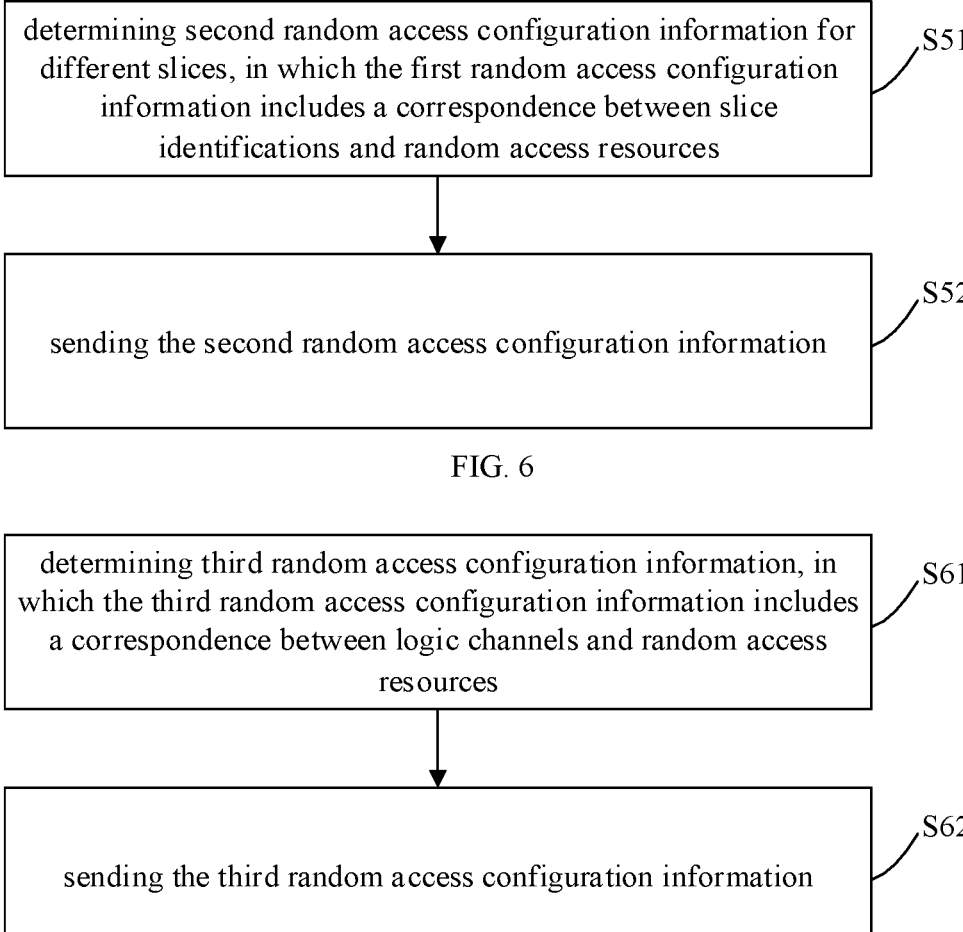

determining second random access configuration information for different slices, in which the first random access configuration information includes a correspondence between slice identifications and random access resources ⟋S51 sending the second random access configuration information ⟋S52

FIG. 6 determining third random access configuration information, in which the third random access configuration information includes a correspondence between logic channels and random access resources ⟋S61 sending the third random access configuration information ⟋S62

FIG. 7

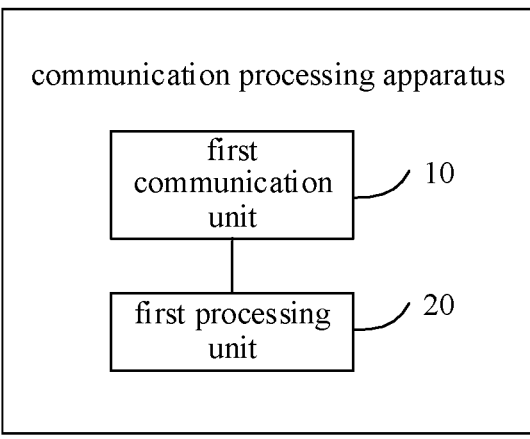

communication processing apparatus first communication unit ⟋ 10 first processing unit ⟋ 20

FIG. 8

METHOD AND DEVICE FOR COMMUNICATION PROCESSING

CROSS-REFERENCE TO RELATED APPLICATION

This application is a U.S. national phase of International Application No. PCT/CN2020/078456, filed with the State Intellectual Property Office of P. R. China on Mar. 9, 2020, the content of which is hereby incorporated by reference in its entirety into this disclosure.

TECHNICAL FIELD

The disclosure relates to communication technologies, and more particularly to a communication processing method and apparatus.

BACKGROUND

For a random access, in order to avoid random access interference, a user equipment (UE) needs to select a suitable random access resource to perform the random access. However, there is no implementation solution of selecting a suitable random access resource to perform the random access.

SUMMARY

The disclosure provides a communication processing method and apparatus.

According to a first aspect of embodiments of the disclosure, a communication processing method is provided. The method includes: receiving first random access configuration information for different access categories; and performing a random access on a random access resource of an access category for which a random access is triggered based on the first random access configuration information for the access category for which the random access is triggered.

According to a second aspect of the embodiments of the disclosure, a communication processing method is provided. The method includes: receiving second random access configuration information for different slices; and performing a random access on a random access resource of a target slice for which a random access is triggered based on the second random access configuration information for the target slice for which the random access is triggered.

According to a third aspect of the embodiments of the disclosure, a communication processing method is provided. The method is applied in a UE and includes: receiving third random access configuration information; and selecting a random access resource of a first logic channel based on the third random access configuration information to perform a random access when the random access is triggered by the UE due to a data transmission on the first logic channel.

According to a fourth aspect of the embodiments of the disclosure, a communication processing method is provided. The method includes determining first random access configuration information for different access categories, in which the first random access configuration information includes a correspondence between access category identifications and random access resources; and sending the first random access configuration information.

According to a fifth aspect of the embodiments of the disclosure, a communication processing method is provided. The method includes determining second random access configuration information for different slices, in which the second random access configuration information includes a correspondence between slice identifications and random access resources; and sending the second random access configuration information.

According to a sixth aspect of the embodiments of the disclosure, a communication processing method is provided. The method includes determining third random access configuration information, in which the third random access configuration information includes a correspondence between logic channels and random access resources; and sending the third random access configuration information.

The technical solution provided in the embodiments of the disclosure may include the following beneficial effects.

First random access configuration information for different access categories is received. A random access is performed on a random access resource of an access category for which a random access is triggered based on the first random access configuration information for the access category. In this way, by performing the random access on the random access resource of the access category for which a random access is triggered, the random access interference may be avoided.

It should be understood that the above general description and the following details are explanatory and illustrative, and shall not be construed to limit the present disclosure.

BRIEF DESCRIPTION OF THE DRAWINGS

The accompanying drawings are incorporated into the disclosure as one part therein to illustrate embodiments of the present disclosure. The accompanying drawings together with the specification explain the principle of the present disclosure.

FIG. 3 is a second flowchart illustrating a communication processing method according to an embodiment of the disclosure.

FIG. 4 is a third flowchart illustrating a communication processing method according to an embodiment of the disclosure.

FIG. 5 is a fourth flowchart illustrating a communication processing method according to an embodiment of the disclosure.

FIG. 6 is a fifth flowchart illustrating a communication processing method according to an embodiment of the disclosure.

FIG. 7 is a sixth flowchart illustrating a communication processing method according to an embodiment of the disclosure.

FIG. 8 is a first block diagram illustrating a communication processing apparatus according to an embodiment of the disclosure.

DETAILED DESCRIPTION

The embodiments will be described in details here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

The terms used in the embodiments of the disclosure are only for the purpose of describing particular embodiments, but should not be construed to limit the embodiments of the disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

It should be further understood that, although terms such as "first", "second" and "third" are used herein for describing various elements, these elements should not be limited by these terms. These terms are only used for distinguishing one element from another element. For example, first information may also be called second information, and similarly, the second information may also be called the first information, without departing from the scope of the present disclosure. As used herein, the term "if" may be construed to mean "when" or "upon" or "in response to determining" or "in accordance with a determination" or "in response to detecting," that a stated condition precedent is true, depending on the context.

Figure 1:
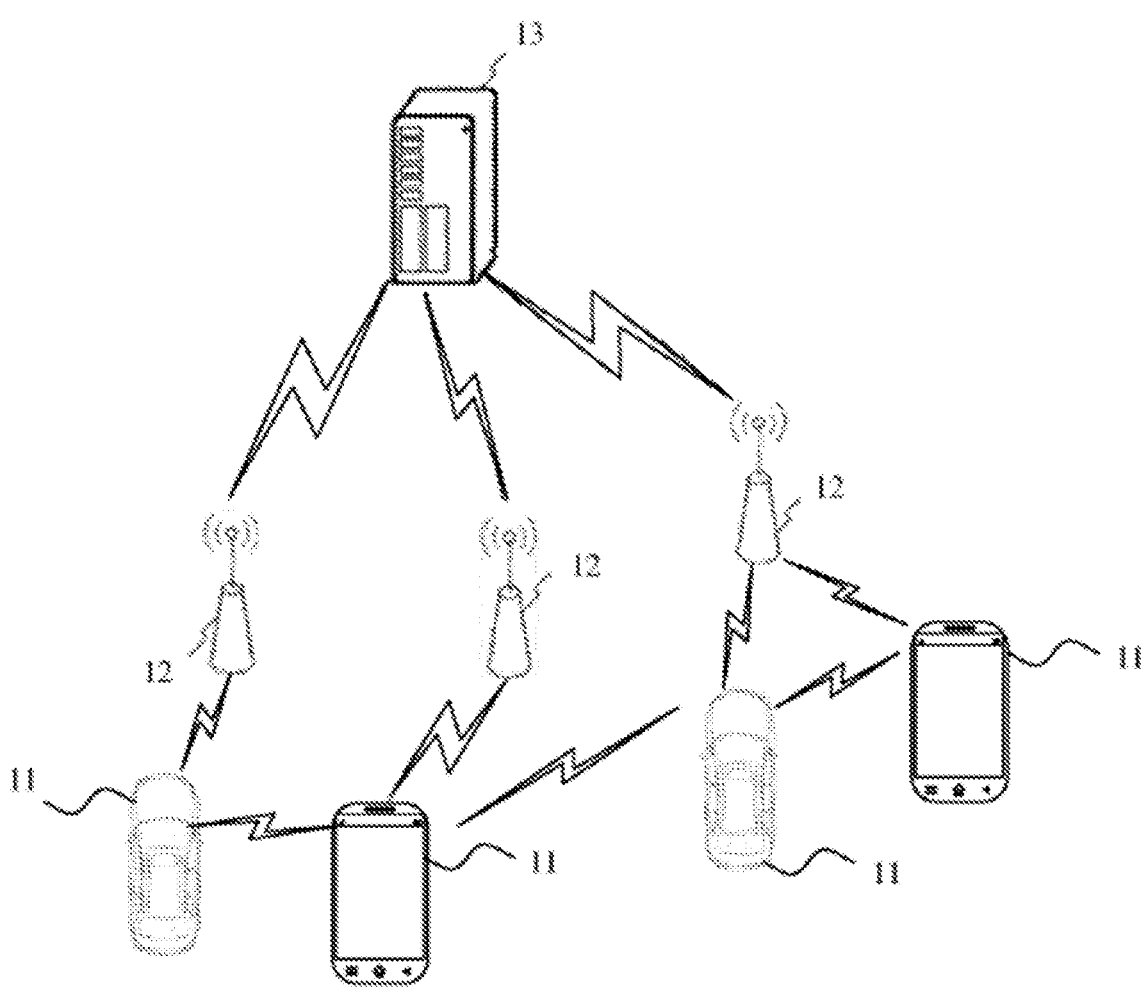
FIG. 1 is a schematic diagram illustrating a wireless communication system according to an embodiment of the disclosure.

With reference to FIG. 1, FIG. 1 is a schematic diagram illustrating a wireless communication system according to an embodiment of the disclosure. As illustrated in FIG. 1, the wireless communication system is a communication system based on the cellular mobile communication technology. The wireless communication system may include several terminals 11 and several base stations 12.

The terminal 11 may be a device that provides voice and/or data connectivity to a user. The terminal 11 can communicate with one or more core networks via a radio access network (RAN). The terminal 11 can be an IoT terminal, such as a sensor device, a mobile phone (or a cellular phone), and a computer having an IoT terminal, for example, a fixed, portable, pocket-sized, handheld, built-in computer or vehicle-mounted device, such as, a station (STA), a subscriber unit, a subscriber station, a mobile station, a mobile, a remote station, an access point, a remote terminal, an access terminal, a user terminal, a user agent, or a user equipment (UE). Alternatively, the terminal 11 may also be a device of an unmanned aerial vehicle. Alternatively, the terminal 11 may also be an in-vehicle device, for example, the terminal 11 may be a vehicle-mounted computer with a wireless communication function, or a wireless communication device externally connected to a vehicle-mounted computer. Alternatively, the terminal 11 may also be a roadside device, for example, a road light with a wireless communication function, a traffic light or other roadside devices and so on.

The base station 12 may be a network side device in the wireless communication system. The wireless communication system may be a 4th generation mobile communication (4G) system, also known as the long term evolution (LTE) system. The wireless communication system may be a 5G system, also known as the new radio (NR) system or 5G NR system. Alternatively, the wireless communication system may also be a next-generation system of the 5G system. An access network in the 5G system may be called as a new generation radio access network (NG-RAN), or a machine-type communication (MTC) system.

The base station 12 may be a base station (eNB) adopting a centralized and distributed architecture in the 4G system. Alternatively, the base station 12 may be a base station (gNB) adopting a centralized and distributed architecture in the 5G system. When the base station 12 adopts the centralized and distributed architecture, it generally includes a central unit (CU) and at least two distributed units (DUs). The CU is provided with a protocol stack including a packet data convergence protocol (PDCP) layer, a radio link control (RLC) layer, and a media access control (MAC) layer. The DU is provided with a protocol stack including a physical (PHY) layer, and the embodiment of the disclosure does not limit the specific implementation manner of the base station 12.

A wireless connection can be established between the base station 12 and the terminal 11 through a wireless air interface. In different embodiments, the wireless air interface is a wireless air interface based on the 4G standard. Alternatively, the wireless air interface is a wireless air interface based on the 5G standard. For example, the wireless air interface is the NR. Alternatively, the wireless air interface can also be a wireless air interface based on a standard of next generation mobile communication network technology based on the 5G.

In some embodiments, an end to end (E2E) connection can be established between the terminals 11, for example a vehicle to vehicle (V2V) communication, a vehicle to infrastructure (V2I) communication, vehicle to pedestrian (V2P) communication and other scenarios in the vehicle to everything (V2X) communication.

Alternatively, the wireless communication system may further include a network management device 13.

A plurality of the base stations 12 are connected to the network management device 13 respectively. The network management device 13 may be a core network device in the wireless communication system. For example, the network management device 13 may be a mobility management entity (MME) of an evolved packet core (EPC) network. Alternatively, the network management device may also be other core network devices, such as a serving gateway (SGW), a public data network gateway (PGW), and a policy and charging rules function (PCRF) unit or a home subscriber server (HSS). The implementation form of the network management device 13 is not limited in the embodiment of the disclosure.

A network slicing technology is introduced in the 5G, which allows a network (a core network and an access network) to be divided into multiple slices within which different services are transmitted without interfering to each other. A congestion of a large amount of services in one slice does not affect normal operation of other services in other slices.

Based on the above wireless communication system, various embodiments of the disclosure are proposed to solve a problem how a UE selects a random access resource corresponding to a service.

Figure 2:
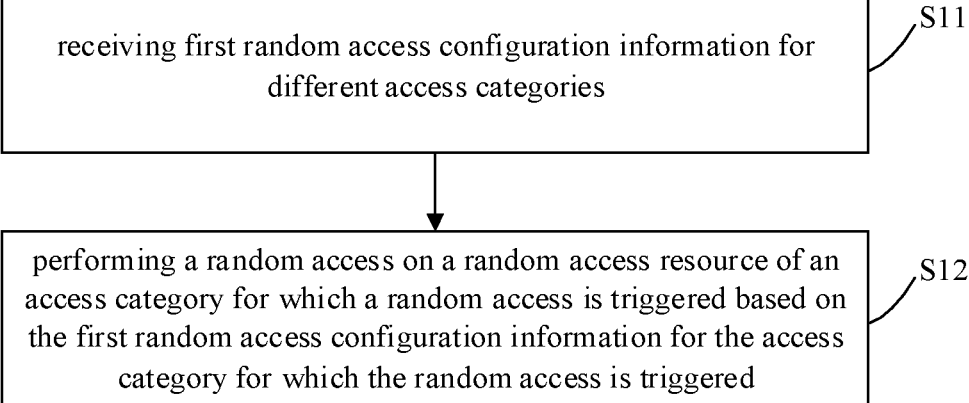
FIG. 2 is a first flowchart illustrating a communication processing method according to an embodiment of the disclosure.

FIG. 2 is a first flowchart illustrating a communication processing method according to an embodiment of the disclosure. The method is applied in a UE, as illustrated in FIG. 2, the method includes the following.

At block S11, first random access configuration information for different access categories is received.

At block S12, a random access is performed on a random access resource of an access category for which a random access is triggered based on the first random access configuration information for the access category.

Different access categories correspond to different first random access configuration information.

In some embodiments of the disclosure, the first random access configuration information includes identification information of the access category.

In this way, by performing the random access on the random access resource of the access category for which a random access is triggered, the random access interference may be avoided.

In some embodiments, the method further includes the following.

At block S13 (not shown in FIG. 2), a common random access resource is selected as the random access resource of the access category to perform the random access when the first random access configuration information does not configure a random access resource for the access category.

It can be seen that, if a network device does not configure a random access resource for a certain access category, the random access corresponding to the access category uses the common random access resource. In this way, the common random access resource configured for a certain access category can be indicated to the UE in case of saving data overhead.

For example, the network device sends multiple pieces of first random access configuration information to the UE. The multiple pieces of first random access configuration information include first random access configuration information for a first access category and first random access configuration information for a second access category. If the access category for which the random access is triggered is a third access category, and the multiple pieces of first random access configuration information do not include first random access configuration information for the third access category, the common random access resource is selected as the random access resource of the third access category to perform the random access.

In some embodiments, the method further includes determining the access category for which the random access is triggered based on access category information provided when a non-access stratum (NAS) requests an access stratum (AS) to initiate a radio resource control (RRC) connection.

For example, the NAS provides the access category information to the AS when requesting the AS to initiate the RRC connection, the AS then initiates the random access to establish the RRC connection. For example, if the access category information provided when the NAS requests the AS to initiate the RRC connection is the first access category, the AS selects the random access resource configured by the network device for the first access category and initiates the random access so as to establish the RRC connection.

In some embodiments, block S11 includes receiving the first random access configuration information for different access categories sent through a broadcast message.

In this way, the UE may obtain the first random access configuration information for different access categories through the broadcast message, thus saving signaling overhead at the network device side.

In some embodiments, the first random access configuration information includes one or more of the following information: a random access preamble, a time-frequency domain resource position of a random access channel (RACH), a maximum number of transmissions of the random access preamble, a random access response window size, a power ramping step, a duration of a competition timer, a subcarrier spacing of MSG1, a message size of MSG3 of a random access of Group A, and so on.

In the above solution, the UE is in one of an idle state or an inactive state.

The method of the embodiment may be applied in a slice type service. For example, when the network configures the first random access configuration information corresponding to different access categories for the UE, the access category corresponds to the slice. When the UE has an uplink service, and the NAS requests the AS to establish a wireless connection, the NAS may also indicate the access category corresponding to this access. The AS of the UE determines a target slice corresponding to the service based on the access category, and selects a random access resource configured for the target slice from the first random access configuration information for the access category corresponding to the target slice.

The method of the embodiment may be applied in services of different UE types. For example, different UE types include a controlling UE and a controlled UE. For example, when the network configures the first random access configuration information corresponding to different access categories for the UE, the access categories include an access category corresponding to the controlled UE and an access category corresponding to the controlling UE, if the access category for which the random access of a first UE is triggered is the access category corresponding to the controlled UE, a random access resource configured for the access category corresponding to the controlled UE is selected from the first random access configuration information for the access category corresponding to the controlled UE.

The method of the embodiment may be applied in services of different service types. For example, different service types include a speech service and a video service. For example, when the network configures the first random access configuration information corresponding to different access categories for the UE, the access categories include an access category corresponding to the speech service and an access category corresponding to the video service, if the access category for which the random access of the UE is triggered is the access category corresponding to the speech service, a random access resource configured for the access category corresponding to the speech service is selected from the first random access configuration information for the access category corresponding to the speech service.

It should be noted that, the above application scenario is merely illustrative. The application scenario includes but is not limited to the above listed scenarios, specifically including one or a combination of many scenarios of the above listed scenarios, which is not limited herein.

According to the technical solution of the embodiment, the UE receives the first random access configuration information for different access categories and performs the random access on the random access resource of the access category for which a random access is triggered based on the first random access configuration information for the access category. In this way, by performing the random access on the random access resource of the access category for which a random access is triggered, the random access interference may be avoided.

FIG. 3 is a second flowchart illustrating a communication processing method according to an embodiment of the disclosure. The communication processing method is applied in a UE. As illustrated in FIG. 3, the communication processing method includes the following.

At block S21, second random access configuration information for different slices is received.

At block S22, a random access is performed on a random access resource of a target slice for which a random access is triggered based on the second random access configuration information for the target slice.

Different slices correspond to different second random access configuration information.

In the embodiment of the disclosure, the second random access configuration information includes identification information of the slice.

In the embodiment of the disclosure, the slice may be identified by single network slice selection assistance information (S-NSSAI) or a slice service type (SST).

In this way, by performing the random access on the random access resource of the target slice for which a random access is triggered, the random access interference may be avoided.

In some embodiments, the method further includes the following.

At block S23 (not shown in FIG. 3), a common random access resource is selected as the random access resource of the target slice to perform the random access when the second random access configuration information does not configure a random access resource for the target slice.

It can be seen that, if a network device does not configure a random access resource for a certain slice, the random access corresponding to the slice uses the common random access resource. In this way, the common random access resource configured for a certain slice can be indicated to the UE in case of saving data overhead.

For example, the network device sends multiple pieces of second random access configuration information to the UE. The multiple pieces of second random access configuration information include second random access configuration information for a first slice and second random access configuration information for a second slice. If the target slice for which the random access is triggered is a third slice, and the multiple pieces of second random access configuration information do not include second random access configuration information for the third slice, the common random access resource is selected as the random access resource of the third slice to perform the random access.

In some embodiments, the method further includes determining the target slice for which the random access is triggered based on slice identification information provided when a non-access stratum (NAS) requests an access stratum (AS) to initiate a radio resource control (RRC) connection.

For example, the NAS provides the slice identification information to the AS when requesting the AS to initiate the RRC connection, the AS then initiates the random access to establish the RRC connection. For example, if the slice identification information provided when the NAS requests the AS to initiate the RRC connection is the first slice, the AS selects the random access resource configured by the network device for the first slice and initiates the random access so as to establish the RRC connection.

In some embodiments, the method further includes determining the target slice for which the random access is triggered based on slice identification information carried in a PDCCH command when the PDCCH command triggers the random access of the UE.

It can be seen that, when the random access is triggered by the PDCCH command, if the PDCCH command carries the slice identification information, the random access is performed on the random access resource selected based on the slice identification information.

For example, if a trigger which triggers the random access of the UE is the PDCCH command, the target slice for which the random access is triggered is determined based on the slice identification information carried in the PDCCH command, and the random access is performed on the random access resource of the target slice based on the second random access configuration information for the target slice.

In some embodiments, block S21 includes receiving the second random access configuration information for different slices sent through a broadcast message.

In this way, the UE may obtain the second random access configuration information for different slices through the broadcast message, thus saving signaling overhead at the network device side.

In some embodiments, the second random access configuration information includes one or more of the following information: a random access preamble, a time-frequency domain resource position of a random access channel (RACH), a maximum number of transmissions of the random access preamble, a random access response window size, a power ramping step, a duration of a competition timer, a subcarrier spacing of MSG1, a message size of MSG3 of a random access of Group A, and so on.

In the above solution, the UE is in one of an idle state or an inactive state.

According to the technical solution of the embodiment, the UE receives the second random access configuration information for different slices and performs the random access on the random access resource of the target slice for which a random access is triggered based on the second random access configuration information for the target slice. In this way, by performing the random access on the random access resource of the target slice, the random access interference may be avoided.

FIG. 4 is a second flowchart illustrating a communication processing method according to an embodiment of the disclosure. The communication processing method is applied in a UE. As illustrated in FIG. 4, the communication processing method includes the following.

At block S31, third random access configuration information is received.

At block S32, when a random access is triggered by the UE due to a data transmission on a first logic channel, a random access resource of the first logic channel is selected based on the third random access configuration information to perform the random access.

In the embodiment of the disclosure, the third random access configuration information includes random access resources of multiple logic channels, and different logic channels correspond to different random access resources.

In some embodiments, the third random access configuration information includes one or more of the following information: a random access preamble, a time-frequency domain resource position of a random access channel (RACH), a maximum number of transmissions of the random access preamble, a random access response window size, a power ramping step, a duration of a competition timer, a subcarrier spacing of MSG1, a message size of MSG3 of a random access of Group A, and so on.

In this way, the random access resource is selected on the basis of the logic channel, the random access interference may be avoided.

In some embodiments, the method further includes the following.

At block S33 (not shown in FIG. 4), a common random access resource is selected as the random access resource of the first logic channel to perform the random access when the third random access configuration information does not include the random access resource of the first logic channel.

It can be seen that, if a network device does not configure a random access resource for a certain logic channel, the random access corresponding to the logic channel uses the common random access resource. In this way, the common random access resource configured for a certain logic channel can be indicated to the UE in case of saving data overhead.

For example, the network device sends the third random access configuration information to the UE. The third random access configuration information includes random access configuration information for a second logic channel and random access configuration information for a third logic channel, but does not include random access configuration information for a first logic channel. The common random access resource is selected as the random access resource of the first logic channel to perform the random access.

In some embodiments, the third random access configuration information includes a first correspondence between logic channel identifications and random access resources. Block S32 may include the following.

At block S32a, a random access resource corresponding to a logic channel identification of the first logic channel is selected based on the first correspondence to perform the random access.

For example, the network device sends the third random access configuration information to the UE. The third random access configuration information includes the first correspondence between logic channel identifications and random access resources. For example, the first correspondence includes: logic channel identification 1 corresponding to random access resource 1, logic channel identification 2 corresponding to random access resource 2, and logic channel identification 3 corresponding to random access resource 3. When the UE triggers the random access due to the data transmission on the first logic channel, if the logic channel identification corresponding to the first logic channel is the logic channel identification 2, the random access resource 2 corresponding to the logic channel identification 2 is selected to perform the random access.

In some embodiments, the method further includes determining the first logic channel based on the logic channel identification determined from a paging message for paging the UE when the paging message is received.

It can be seen that, the method is applicable to the UE in the inactive state. When the network pages the UE in the inactive state, the logic channel identification may be indicated in the paging message. The UE in the inactive state receives the paging message and initiates the random access based on the random access resource corresponding to the logic channel identification.

In some embodiments, the method further includes determining the first logic channel based on logic channel identification information carried in a PDCCH command when the random access is triggered by the UE due to the PDCCH command.

It can be seen that, when the random access triggered due to the PDCCH command, if the PDCCH command carries the logic channel identification information, the UE may select the corresponding random access resource based on the logic channel identification information to initiate the random access.

In some embodiments, the method further includes: when the UE enters an inactive state from a connected state, for the random access triggered due to a data transmission on a logic channel, determining the logic channel triggering the random access as the first logic channel.

It can be seen that, when the UE enters the inactive state from the connected state, for the random access triggered due to a data transmission on a logic channel, the UE may continue to use the random access resource configured for the logic channel triggering the random access to initiate the random access.

In some embodiments, when the UE enters an inactive state from a connected state, the method further includes: deleting the third random access configuration information in response to the UE switching a connected cell or the UE leaving a cell allowed to be accessed in the third random access configuration information.

It can be seen that, if the UE switches the connected UE, or the UE leaves the cell allowed to be accessed in the third random access configuration information, the third random access configuration information configured for the UE is invalid, when the configuration is invalid, the UE may delete such configuration.

According to the technical solution of the embodiment of the disclosure, the UE may perform the random access on the random access resource based on the logic channel identification of the logic channel, such that the interference of the random accesses triggered due to the data transmission on the logic channel can be avoided.

In some embodiments, the method further includes receiving logic channel configuration information, in which the logic channel configuration information comprises slice configuration information corresponding to a logic channel.

The method further includes determining a logic channel corresponding to a slice requesting for access as the first logic channel based on the slice configuration information corresponding to the logic channel configuration information.

It can be seen that, if the network configures the slice configuration information for the logic channel, the corresponding logic channel can be identified by the slice identification.

In some embodiments, determining the logic channel corresponding to the slice requesting for access as the first logic channel based on the slice configuration information corresponding to the logic channel configuration information further includes determining the network slice requesting for access in response to slice identification information carried in a PDCCH command being the same as slice identification information contained in the slice configuration information when the random access is triggered by the UE due to the PDCCH command.

It can be seen that, when the random access is triggered due to the PDCCH command, if the PDCCH command carries the slice identification information, the UE may select the corresponding random access resource from the slice configuration information based on the slice identification information to initiate the random access.

In the embodiment of the disclosure, the slice may be identified by single network slice selection assistance information (S-NSSAI) or a slice service type (SST).

In some embodiments, determining the logic channel corresponding to the slice requesting for access as the first logic channel based on the slice configuration information corresponding to the logic channel configuration information includes: when the UE enters an inactive state from a connected state, for the random access triggered due to a data transmission on a logic channel, determining the logic channel corresponding to the slice requesting for access as the first logic channel based on the slice configuration information corresponding to the logic channel configuration information in combination with a slice identification carried when the random access is triggered.

It can be seen that, when the UE enters the inactive state from the connected state, for the random access triggered due to a data transmission on a logic channel, the UE may, based on the slice corresponding to the logic channel, continue to use the random access resource configured for the slice to initiate the random access.

In some embodiments, the method further includes: deleting the third random access configuration information in response to the UE switching a connected cell or the UE leaving a cell suitable for the third random access configuration information when the UE enters an inactive state from a connected state.

It can be seen that, if the UE switches the connected UE, or the UE leaves the cell suitable for the third random access configuration information, the third random access configuration information configured for the UE is invalid, when the configuration is invalid, the UE may delete such configuration.

In the above solution, the first logic channel is a logic channel corresponding to DRB carrying data.

According to the technical solution of the embodiment of the disclosure, the UE may select the random access resource based on the slice corresponding to the logic channel to perform the random access, such that the interference of the random accesses triggered due to the data transmission on the logic channel can be avoided.

Corresponding to the communication processing method shown in FIG. 2, the embodiments of the disclosure further provide a communication processing method. The communication processing method is applied in a network device, such as a base station. As illustrated in FIG. 5, the communication processing method includes the following.

At block S41, for different access categories, first random access configuration information is determined. The first random access configuration information includes a correspondence between access category identifications and random access resources.

At block S42, the first random access configuration information is sent.

In the embodiment of the disclosure, the first random access configuration information includes identification information of the access category.

In the embodiment of the disclosure, different access categories correspond to different first random access configuration information.

In this way, the network device configures different first random access configuration information for different access categories, such that the UE may perform the random access on the random access resource of the access category for which a random access is triggered, thus avoiding the random access interference.

In some embodiments, the method further includes determining first random access configuration information for a common random access resource.

If the sent multiple pieces of first random access configuration information do not include the first random access configuration information configured for the first access category, the first random access configuration information for the common random access resource is indicated as the first random access configuration information configured for the first access category.

It can be seen that, if the network device does not configure the random access resource for a certain access category, the random access corresponding to the access category uses the common random access resource. In this way, the common random access resource configured for a certain access category can be indicated to the UE in case of saving data overhead.

For example, the network device sends multiple pieces of first random access configuration information to the UE. The multiple pieces of first random access configuration information include first random access configuration information for a first access category and first random access configuration information for a second access category. If the access category for which the random access is triggered is a third access category, and the multiple pieces of first random access configuration information do not include first random access configuration information for the third access category, the common random access resource is selected as the random access resource of the third access category to perform the random access.

In some embodiments, block S42 includes the following.

At block S42a, the first random access configuration information for different access categories is sent through a broadcast message.

In this way, signaling overhead at the network device side can be saved.

In some embodiments, the first random access configuration information includes one or more of the following information: a random access preamble, a time-frequency domain resource position of a random access channel (RACH), a maximum number of transmissions of the random access preamble, a random access response window size, a power ramping step, a duration of a competition timer, a subcarrier spacing of MSG1, a message size of MSG3 of a random access of Group A, and so on.

In the above solution, the UE is in one of an idle state or an inactive state.

The method of the embodiment may be applied in a slice type service. For example, when the network configures the first random access configuration information corresponding to different access categories for the UE, the access category corresponds to the slice. When the UE has an uplink service, and the NAS requests the AS to establish a wireless connection, the NAS may also indicate the access category corresponding to this access. The AS of the UE determines a target slice corresponding to the service based on the access category, and selects a random access resource configured for the target slice from the first random access configuration information for the access category corresponding to the target slice.

The method of the embodiment may be applied in services of different UE types. For example, different UE types include a controlling UE and a controlled UE. For example, when the network configures the first random access configuration information corresponding to different access categories for the UE, the access categories include an access category corresponding to the controlled UE and an access category corresponding to the controlling UE, if the access category for which the random access of a first UE is triggered is the access category corresponding to the controlled UE, a random access resource configured for the access category corresponding to the controlled UE is selected from the first random access configuration information for the access category corresponding to the controlled UE.

The method of the embodiment may be applied in services of different service types. For example, different service types include a speech service and a video service. For example, when the network configures the first random access configuration information corresponding to different access categories for the UE, the access categories include an access category corresponding to the speech service and an access category corresponding to the video service, if the access category for which the random access of the UE is triggered is the access category corresponding to the speech service, a random access resource configured for the access category corresponding to the speech service is selected from the first random access configuration information for the access category corresponding to the speech service.

It should be noted that, the above application scenario is merely illustrative. The application scenario includes but is not limited to the above listed scenarios, specifically including one or a combination of many scenarios of the above listed scenarios, which is not limited herein.

According to the technical solution of the embodiment, the network device determines the first random access configuration information for different access categories, the first random access configuration information includes the correspondence between access category identifications and random access resources. The network device sends the first random access configuration information. In this way, the network device configures different first random access configuration information for different access categories, such that the UE may perform the random access on the random access resource of the access category for which a random access is triggered, thus avoiding the random access interference.

Corresponding to the communication processing method shown in FIG. 3, the embodiments of the disclosure further provide a communication processing method. The communication processing method is applied in a network device, such as a base station. As illustrated in FIG. 6, the communication processing method includes the following.

At block S51, for different slices, second random access configuration information is determined. The second random access configuration information includes a correspondence between slice identifications and random access resources.

At block S52, the second random access configuration information is sent.

Different slices correspond to different second random access configuration information.

In the embodiment of the disclosure, the second random access configuration information includes identification information of the slice.

In the embodiment of the disclosure, the slice may be identified by single network slice selection assistance information (S-NSSAI) or a slice service type (SST).

In this way, by configuring different second random access configuration information for different slices, the UE may perform the random access on the random access resource of the target slice for which a random access is triggered, thus avoiding the random access interference.

In some embodiments, the method further includes determining second random access configuration information for a common random access resource.

If the sent multiple pieces of second random access configuration information do not include the second random access configuration information configured for the target slice, the second random access configuration information for the common random access resource is indicated as the second random access configuration information configured for the target slice.

It can be seen that, if the network device does not configure the random access resource for a certain slice, the random access corresponding to the slice uses the common random access resource. In this way, the common random access resource configured for a certain slice can be indicated to the UE in case of saving data overhead.

For example, the network device sends multiple pieces of second random access configuration information to the UE. The multiple pieces of second random access configuration information include second random access configuration information for a first slice and second random access configuration information for a second slice. If the target slice for which the random access is triggered is a third slice, and the multiple pieces of second random access configuration information do not include second random access configuration information for the third slice, the common random access resource is selected as the random access resource of the third slice to perform the random access.

In some embodiments, block S52 includes the following.

At block S52a, the second random access configuration information for different slices is sent through a broadcast message.

In this way, signaling overhead at the network device side can be saved.

In some embodiments, the second random access configuration information includes one or more of the following information: a random access preamble, a time-frequency domain resource position of a random access channel (RACH), a maximum number of transmissions of the random access preamble, a random access response window size, a power ramping step, a duration of a competition timer, a subcarrier spacing of MSG1, a message size of MSG3 of a random access of Group A, and so on.

In the above solution, the UE is in one of an idle state or an inactive state.

According to the technical solution of the embodiment, the network device determines the second random access configuration information for different slices, the second random access configuration information includes the correspondence between slice identifications and random access resources. The network device sends the second random access configuration information. In this way, the UE may perform the random access on the random access resource of the target slice, the random access interference may be avoided.

Corresponding to the communication processing method shown in FIG. 4, the embodiments of the disclosure further provide a communication processing method. The communication processing method is applied in a network device, such as a base station. As illustrated in FIG. 7, the communication processing method includes the following.

At block S61, third random access configuration information is determined. The third random access configuration information includes a correspondence between logic channels and random access resources.

At block S62, the third random access configuration information is sent.

In the embodiment of the disclosure, the third random access configuration information may include the random access resources of multiple logic channels. Different logic channels correspond to different random access resources.

In some embodiments, the third random access configuration information includes one or more of the following information: a random access preamble, a time-frequency domain resource position of a random access channel (RACH), a maximum number of transmissions of the random access preamble, a random access response window size, a power ramping step, a duration of a competition timer, a subcarrier spacing of MSG1, a message size of MSG3 of a random access of Group A, and so on.

In this way, the third random access configuration information is assigned based on the logic channel, such that the UE may select the random access resource on the basis of the logic channel, thus avoiding the random access interference.

In some embodiments, the method further includes determining third random access configuration information for a common random access resource.

If the sent multiple pieces of third random access configuration information do not include the third random access configuration information configured for the first logic channel, the third random access configuration information for the common random access resource is indicated as the third random access configuration information configured for the first logic channel.

It can be seen that, if the network device does not configure the random access resource for a certain logic channel, the random access corresponding to the logic channel uses the common random access resource. In this way, the common random access resource configured for a certain logic channel can be indicated to the UE in case of saving data overhead.

For example, the network device sends the third random access configuration information to the UE. The third random access configuration information includes random access configuration information for a second logic channel and random access configuration information for a third logic channel, but does not include random access configuration information for a first logic channel. The common random access resource is selected as the random access resource of the first logic channel to perform the random access.

In some embodiments, the third random access configuration information includes a first correspondence between logic channel identifications and random access resources. The method further includes receiving a random access request initiated based on the random access resource selected based on the first correspondence.

For example, the network device sends the third random access configuration information to the UE. The third random access configuration information includes the first correspondence between logic channel identifications and random access resources. For example, the first correspondence includes: logic channel identification 1 corresponding to random access resource 1, logic channel identification 2 corresponding to random access resource 2, and logic channel identification 3 corresponding to random access resource 3. When the UE triggers the random access due to the data transmission on the first logic channel, if the logic channel identification corresponding to the first logic channel is the logic channel identification 2, the random access resource 2 corresponding to the logic channel identification 2 is selected to perform the random access.

In some embodiments, block S62 includes the following.

At block S62a, the third random access configuration information independently configured for different logic channels is sent.

In this way, the UE may quickly find the third random access configuration information for a certain logic channel.

According to the technical solution of the embodiment of the disclosure, the UE may perform the random access on the random access resource based on the logic channel identification of the logic channel, such that the interference of the random accesses triggered due to the data transmission on the logic channel can be avoided.

In some embodiments, the method further includes determining logic channel configuration information, in which the logic channel configuration information includes slice configuration information corresponding to the logic channel; and sending the logic channel configuration information.

In this way, the UE may select the random access resource based on the slice configuration information corresponding to the logic channel to perform the random access, such that the interference of the random accesses triggered due to the data transmission on the logic channel can be avoided.

In some embodiments, the third random access configuration information carries indication information of cells allowed to be accessed.

In this way, when the UE leaves the cell suitable for the third random access configuration information, the third random access configuration information is invalid to the UE, when the configuration is invalid, the UE may delete such configuration.

In the above solution, the first logic channel is a logic channel corresponding to DRB carrying data.

According to the technical solution of the embodiment of the disclosure, the UE may select the random access resource based on the logic channel to perform the random access, such that the interference of the random accesses triggered due to the data transmission on the logic channel can be avoided.

Corresponding to the communication processing method applied in a UE shown in FIG. 2, the embodiments of the disclosure further provide a communication processing apparatus applied in the UE. As illustrated in FIG. 8, the apparatus includes a first communication unit 10 and a first processing unit 20.

The first communication unit 10 is configured to receive first random access configuration information for different access categories.

The first processing unit 20 is configured to perform a random access on a random access resource of an access category for which a random access is triggered based on the first random access configuration information for the access category.

Regarding the apparatus in the above embodiment, the specific manner in which each module performs operations has been described in detail in the method embodiments, and will not be described in detail here.

In practice, the specific structures of the first communication unit 10 and the first processing unit 20 may be implemented by the communication processing apparatus, or a central processing unit (CPU), a micro controller unit (MCU), a digital signal processing (DSP) or a programmable logic controller (PLC) in a device to which the communication processing apparatus belongs.

Those skilled in the art should understand that the functions of each processing module in the communication processing apparatus of the embodiment of the present disclosure can be understood by referring to the relevant description of the communication processing method shown in FIG. 2. Each processing module in the communication processing apparatus of the embodiment of the present disclosure can be implemented by an analog circuit performing functions described in the embodiments of the present disclosure, and can also be implemented by running software that executes the functions described in the embodiments of the present disclosure on a device.

The communication processing apparatus according to the embodiments of the disclosure may select appropriate random access resource to perform the random access, thus avoiding the random access interference.

Figure 9:
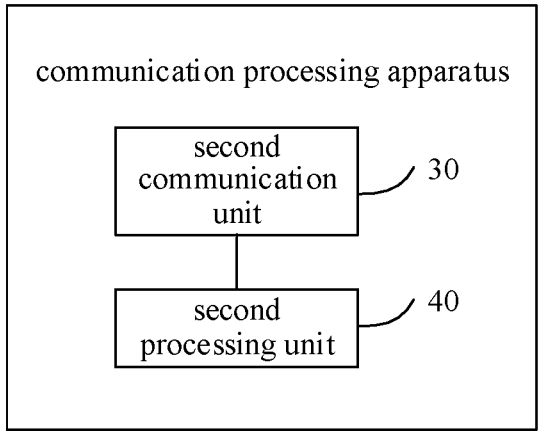
FIG. 9 is a second block diagram illustrating a communication processing apparatus according to an embodiment of the disclosure.

Corresponding to the communication processing method applied in a network device shown in FIG. 3, the embodiments of the disclosure further provide a communication processing apparatus applied in the network device, such as a base station. As illustrated in FIG. 9, the apparatus includes a second communication unit 30 and a second processing unit 40.

The second communication unit 30 is configured to receive second random access configuration information for different slices.

The second processing unit 40 is configured to perform a random access on a random access resource of a target slice for which a random access is triggered based on the second random access configuration information for the target slice.

Regarding the apparatus in the above embodiment, the specific manner in which each module performs operations has been described in detail in the method embodiments, and will not be described in detail here.

In practice, the specific structures of the second communication unit 30 and the second processing unit 40 may be implemented by the communication processing apparatus, or a CPU, an MCU, a DSP or a PLC in a device to which the communication processing apparatus belongs.

Those skilled in the art should understand that the functions of each processing module in the communication processing apparatus of the embodiment of the present disclosure can be understood by referring to the relevant description of the communication processing method shown in FIG. 3. Each processing module in the communication processing apparatus of the embodiment of the present disclosure can be implemented by an analog circuit performing functions described in the embodiments of the present disclosure, and can also be implemented by running software that executes the functions described in the embodiments of the present disclosure on a device.

The communication processing apparatus according to the embodiments of the disclosure may select appropriate random access resource to perform the random access, thus avoiding the random access interference.

Figure 10:
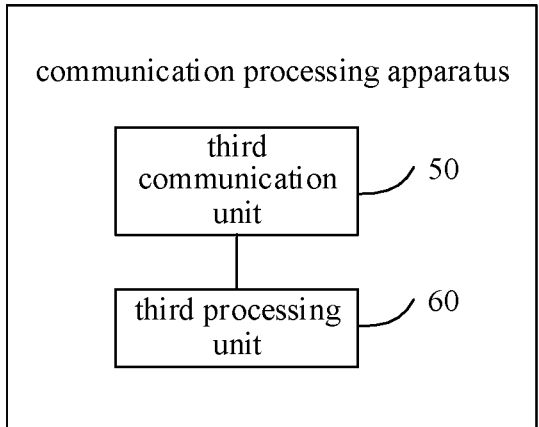
FIG. 10 is a third block diagram illustrating a communication processing apparatus according to an embodiment of the disclosure.

Corresponding to the communication processing method applied in a UE shown in FIG. 4, the embodiments of the disclosure further provide a communication processing apparatus applied in the UE. As illustrated in FIG. 10, the apparatus includes a third communication unit 50 and a third processing unit 60.

The third communication unit 50 is configured to receive third random access configuration information.

The third processing unit 60 is configured to select a random access resource of a first logic channel based on the third random access configuration information to perform a random access when a random access is triggered by the UE due to data on the first logic channel.

In some embodiments, the third communication unit 50 is further configured to send logic channel configuration information, in which the logic channel configuration information includes slice configuration information corresponding to the logic channel.

Regarding the apparatus in the above embodiment, the specific manner in which each module performs operations has been described in detail in the method embodiments, and will not be described in detail here.

In practice, the specific structures of the third communication unit 50 and the third processing unit 60 may be implemented by the communication processing apparatus, or a CPU, an MCU, a DSP or a PLC in a device to which the communication processing apparatus belongs.

Those skilled in the art should understand that the functions of each processing module in the communication processing apparatus of the embodiment of the present disclosure can be understood by referring to the relevant description of the communication processing method shown in FIG. 4. Each processing module in the communication processing apparatus of the embodiment of the present disclosure can be implemented by an analog circuit performing functions described in the embodiments of the present disclosure, and can also be implemented by running software that executes the functions described in the embodiments of the present disclosure on a device.

The communication processing apparatus according to the embodiments of the disclosure may select appropriate random access resource to perform the random access, thus avoiding the random access interference.

Figure 11:
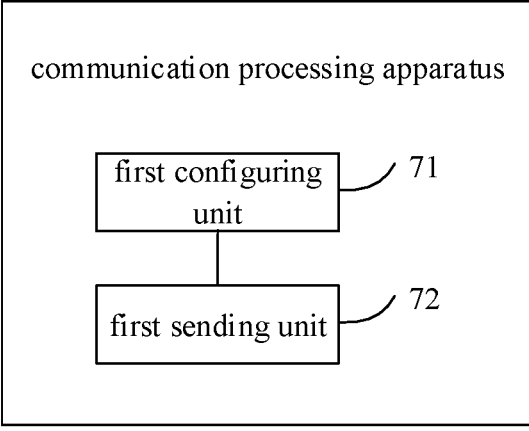
FIG. 11 is a fourth block diagram illustrating a communication processing apparatus according to an embodiment of the disclosure.

Corresponding to the communication processing method applied in a network device shown in FIG. 5, the embodiments of the disclosure further provide a communication processing apparatus applied in the network device. As illustrated in FIG. 11, the apparatus includes a first configuring unit 71 and a first sending unit 72.

The first configuring unit 71 is configured to determine first random access configuration information for different access categories, in which the first random access configuration information includes a correspondence between access category identifications and random access resources.

The first sending unit 72 is configured to send the first random access configuration information.

In some embodiments, the first sending unit 72 is further configured to return a random access response based on a random access request.

Regarding the apparatus in the above embodiment, the specific manner in which each module performs operations has been described in detail in the method embodiments, and will not be described in detail here.

In practice, the specific structures of the first configuring unit 71 and the first sending unit 72 may be implemented by the communication processing apparatus, or a CPU, an MCU, a DSP or a PLC in a device to which the communication processing apparatus belongs.

Those skilled in the art should understand that the functions of each processing module in the communication processing apparatus of the embodiment of the present disclosure can be understood by referring to the relevant description of the communication processing method shown in FIG. 5. Each processing module in the communication processing apparatus of the embodiment of the present disclosure can be implemented by an analog circuit performing functions described in the embodiments of the present disclosure, and can also be implemented by running software that executes the functions described in the embodiments of the present disclosure on a device.

The communication processing apparatus according to the embodiments of the disclosure may select appropriate random access resource to perform the random access, thus avoiding the random access interference.

Figure 12:
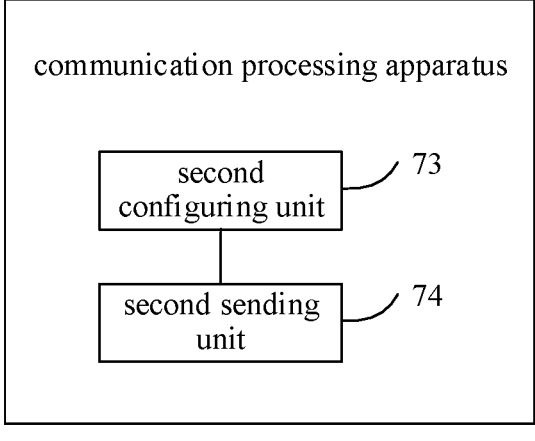
FIG. 12 is a fifth block diagram illustrating a communication processing apparatus according to an embodiment of the disclosure.

Corresponding to the communication processing method applied in a network device shown in FIG. 6, the embodiments of the disclosure further provide a communication processing apparatus applied in the network device. As illustrated in FIG. 12, the apparatus includes a second configuring unit 73 and a second sending unit 74.

The second configuring unit 73 is configured to determine second random access configuration information for different slices, in which the second random access configuration information includes a correspondence between slice identifications and random access resources.

The second sending unit 74 is configured to send the second random access configuration information. Regarding the apparatus in the above embodiment, the specific manner in which each module performs operations has been described in detail in the method embodiments, and will not be described in detail here.

In practice, the specific structures of the second configuring unit 73 and the second sending unit 74 may be implemented by the communication processing apparatus, or a CPU, an MCU, a DSP or a PLC in a device to which the communication processing apparatus belongs.

Those skilled in the art should understand that the functions of each processing module in the communication processing apparatus of the embodiment of the present disclosure can be understood by referring to the relevant description of the communication processing method shown in FIG. 6. Each processing module in the communication processing apparatus of the embodiment of the present disclosure can be implemented by an analog circuit performing functions described in the embodiments of the present disclosure, and can also be implemented by running software that executes the functions described in the embodiments of the present disclosure on a device.

The communication processing apparatus according to the embodiments of the disclosure may select appropriate random access resource to perform the random access, thus avoiding the random access interference.

Figure 13:
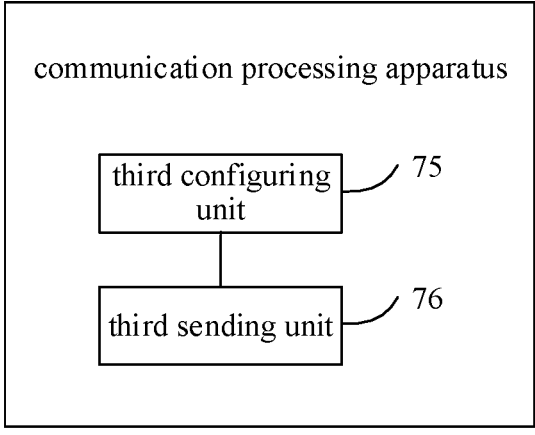
FIG. 13 is a sixth block diagram illustrating a communication processing apparatus according to an embodiment of the disclosure.

Corresponding to the communication processing method applied in a network device shown in FIG. 7, the embodiments of the disclosure further provide a communication processing apparatus applied in the network device. As illustrated in FIG. 13, the apparatus includes a third configuring unit 75 and a third sending unit 76.

The third configuring unit 75 is configured to determine third random access configuration information, in which the third random access configuration information includes a correspondence between logic channels and random access resources.

The third sending unit 76 is configured to send the third random access configuration information.

Regarding the apparatus in the above embodiment, the specific manner in which each module performs operations has been described in detail in the method embodiments, and will not be described in detail here.

In practice, the specific structures of the third configuring unit 75 and the third sending unit 76 may be implemented by the communication processing apparatus, or a CPU, an MCU, a DSP or a PLC in a device to which the communication processing apparatus belongs.

Those skilled in the art should understand that the functions of each processing module in the communication processing apparatus of the embodiment of the present disclosure can be understood by referring to the relevant description of the communication method shown in FIG. 7. Each processing module in the communication processing apparatus of the embodiment of the present disclosure can be implemented by an analog circuit performing functions described in the embodiments of the present disclosure, and can also be implemented by running software that executes the functions described in the embodiments of the present disclosure on a device.

The communication processing apparatus according to the embodiments of the disclosure may select appropriate random access resource to perform the random access, thus avoiding the random access interference.

The embodiments of the disclosure further record a communication processing apparatus. The apparatus includes a memory, a processor and a computer program stored on the memory and executable by the processor. The processor is configured to execute the program to perform the communication processing method according to any technical solution described above.

The embodiments of the disclosure further record a computer storage medium. The computer storage medium is stored with computer-executable instructions. The computer-executable instructions are configured to implement the communication processing method described any of the above embodiments. In other words, when the computer-executable instructions are executed by a processor, the communication processing method according to any technical solution described above can be implemented.

Those skilled in the art should understand that the functions of each program in the computer storage medium of the embodiment can be understood by referring to the relevant descriptions of the communication processing method described in any of the foregoing embodiments.

Figure 14:
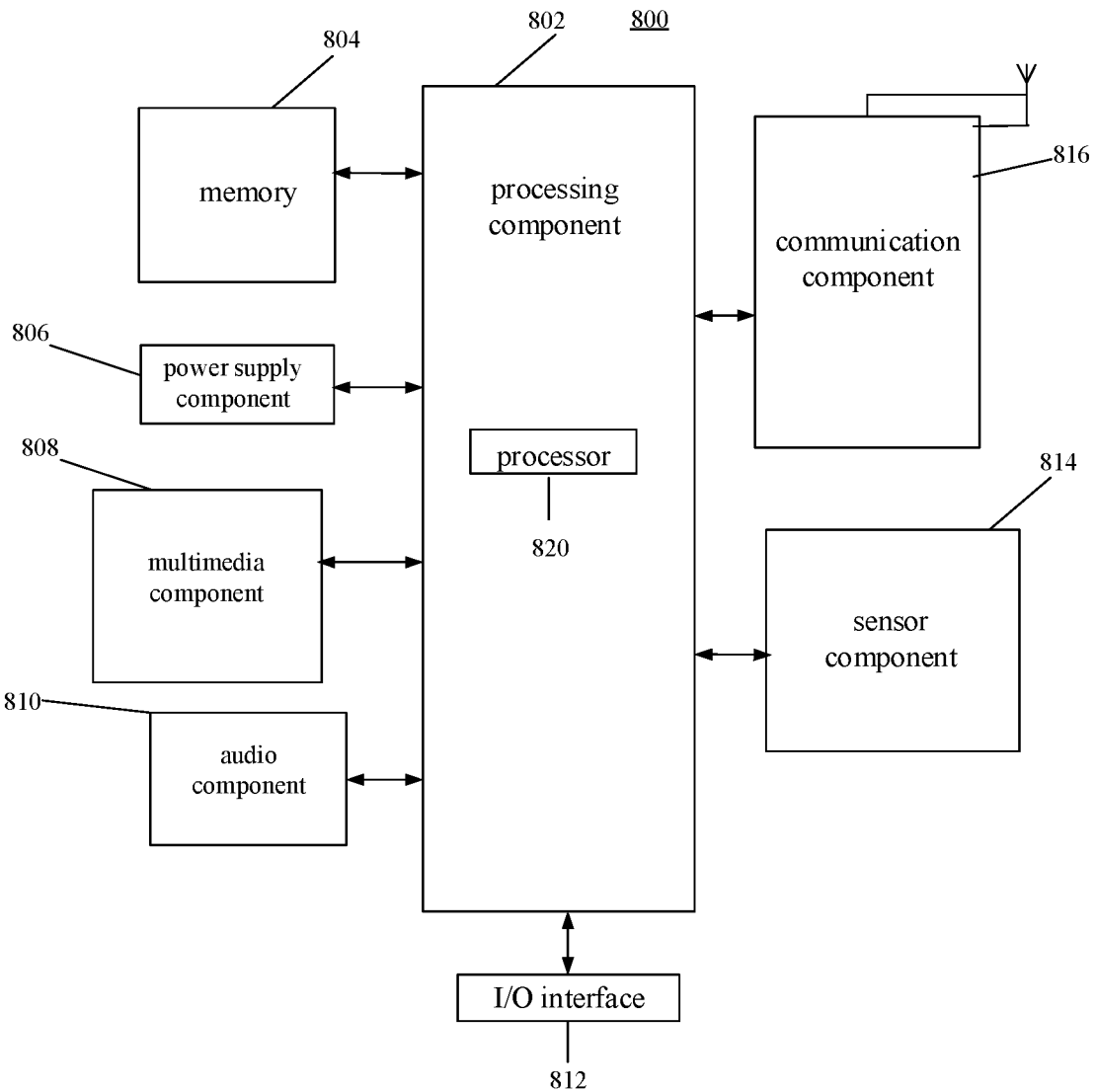
FIG. 14 is a block diagram illustrating an apparatus 800 for implementing a communication processing method according to an embodiment of the disclosure.

FIG. 14 is a block diagram illustrating an apparatus 800 for implementing a communication processing method according to an embodiment of the disclosure. For example, the apparatus 800 may be a mobile phone, a computer, a digital broadcasting terminal, a messaging device, a game console, a tablet device, a medical equipment, a fitness equipment, a personal digital assistant, and so on.

Referring to FIG. 14, the apparatus 800 may include one or more components of the followings: a processing component 802, a memory 804, a power supply component 806, a multimedia component 808, an audio component 810, an input/output (I/O) interface 812, a sensor component 814, and a communication component 816.

The processing component 802 generally controls the whole operation of the apparatus 800, such as the operations related to display, phone call, data communication, camera operation and recording operation. The processing component 802 may include one or more processors 820 to perform instructions, to complete all or part of blocks of the above method.

In addition, the processing component 802 may include one or more modules for the convenience of interaction between the processing component 802 and other components. For example, the processing component 802 may include a multimedia module for the convenience of interaction between the multimedia component 808 and the processing component 802.

The memory 804 is configured to store all types of data to support the operation of the apparatus 800. Examples of the data include the instructions of any applications or methods operated on the apparatus 800, contact data, phone book data, messages, pictures, videos, etc. The memory 804 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 806 may provide power for all components of the apparatus 800. The power supply component 806 may include a power supply management system, one or more power supplies, and other units related to generating, managing and distributing power for the apparatus 800.

The multimedia component 808 includes an output interface screen provided between the apparatus 800 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of a touch or slide action, but also detect the duration and pressure related to the touch or slide operation. In some embodiments, the multimedia component 808 includes a front camera and/or a rear camera. When the apparatus 800 is in an operation mode, such as a shooting mode or a video mode, the front camera or the rear camera may receive the external multimedia data. Each front camera and rear camera may be a fixed optical lens system or an optical lens system with a focal length and an optical zoom capacity.

The audio component 810 is configured to output and/or input an audio signal. For example, the audio component 810 includes a microphone (MIC). When the apparatus 800 is in an operation mode, such as a call mode, a record mode, and a speech recognition mode, the microphone is configured to receive the external audio signal. The received audio signal may be further stored in the memory 804 or sent via the communication component 816. In some embodiments, the audio component 810 further includes a speaker configured to output an audio signal.

The I/O interface 812 provides an interface for the processing component 802 and the peripheral interface module, and the peripheral interface module may be a keyboard, a click wheel, a button, etc. The button may include but not limited to a home button, a volume button, a start button and a lock button.

The sensor component 814 includes one or more sensors, configured to provide various aspects of status assessment for the apparatus 800. For example, the sensor component 814 may detect the on/off state of the apparatus 800 and the relative positioning of the component. For example, the component is a display and a keypad of the apparatus 800. The sensor component 814 may further detect the location change of the apparatus 800 or one component of the apparatus 800, the presence or absence of contact between the user and the apparatus 800, the orientation or acceleration/deceleration of the apparatus 800, and the temperature change of the apparatus 800. The sensor component 814 may include a proximity sensor configured to detect the existence of the objects nearby without any physical contact. The sensor component 814 may further include a light sensor such as a complementary metal oxide semiconductor (CMOS) or a charge-coupled device (CCD) image sensor, which is configured to use in imaging applications. In some embodiments, the sensor component 814 may further include an acceleration transducer, a gyroscope sensor, a magnetic sensor, a pressure sensor or a temperature sensor.

The communication component 816 is configured for the convenience of wire or wireless communication between the apparatus 800 and other devices. The apparatus 800 may access wireless networks based on communication standard, such as WiFi, 2G or 3G, or their combination. In an embodiment, the communication component 816 receives broadcast signals or broadcast-related information from an external broadcast management system via a broadcast channel. In an embodiment, the communication component 816 further includes a near field communication (NFC) module to facilitate short-range communication. For example, the NFC module may be achieved based on a radio frequency identification (RFID) technology, an infrared data association (IrDA) technology, an ultra-wide band (UWB) technology, a blue tooth (BT) technology and other technologies.

In an embodiment, the apparatus 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform any of the above communication processing methods applied at the user terminal side.

In an embodiment, a non-transitory computer-readable storage medium is further provided which includes executable instructions, such as the memory 804 including executable instructions, the executable instructions may be executed by the processor 820 of the apparatus 800 to complete the above methods. For example, the non-transitory computer-readable storage medium may be a ROM, a random access memory (RAM), a CD-ROM, a magnetic tape, a floppy disk, an optical data storage device, etc.

Figure 15:
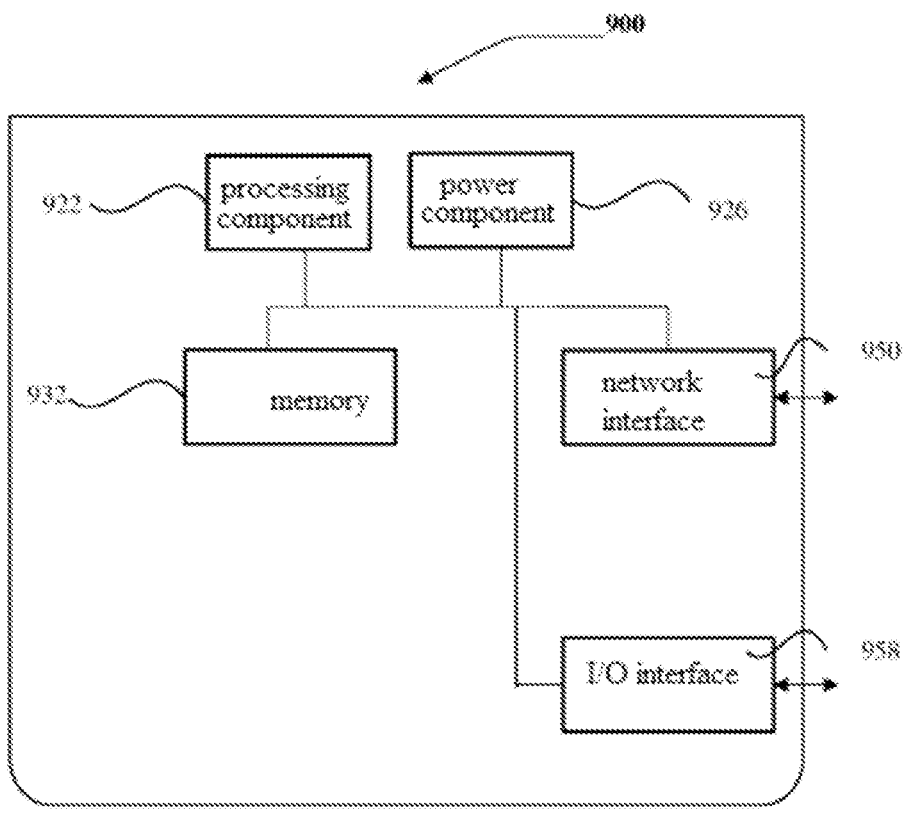
FIG. 15 is a block diagram illustrating an apparatus 900 for implementing a communication processing method according to an embodiment of the disclosure.

FIG. 15 is a block diagram illustrating an apparatus 900 for implementing a communication processing method according to an embodiment of the disclosure. For example, the apparatus 900 may be provided as a server. As illustrated in FIG. 15, the apparatus 900 includes a processing component 922, which further includes one or more processors, and a memory resource represented by a memory 932, for storing instructions executable by the processing component 922, such as an application program. The application program stored in the memory 932 may include one or more modules each corresponding to a set of instructions. In addition, the processing component 922 is configured to execute the instructions to perform any of the above communication processing methods applied at the network device side.

The apparatus 900 may also include a power component 926 configured to perform power management of the apparatus 900, a wired or wireless network interface 950 configured to connect the apparatus 900 to a network, and an input output (I/O) interface 958. The apparatus 900 can operate based on an operating system stored in the memory 932, such as Windows Server™, Mac OS X™, Unix™, Linux™, FreeBSD™ or the like.

The technical solutions described in the embodiments of the present disclosure can be combined arbitrarily if there is no conflict.

After considering the specification and practicing the disclosure herein, those skilled in the art will easily think of other implementations. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of the disclosure are given by the appended claims.

It should be understood that the disclosure is not limited to the precise structure described above and shown in the drawings, and various modifications and changes may be made without departing from its scope. The scope of the present disclosure is only limited by the appended claims.

What is claimed is:

1. A communication processing method, comprising:
    receiving, by a user equipment (UE), multiple pieces of random access configuration information for a plurality of slices from a network device, wherein the network device configures respective random access configuration information for each of the plurality of slices, and wherein each random access configuration information comprises identification information of a corresponding slice and comprises a correspondence between the identification information of the corresponding slice and random access resources, the identification information of the corresponding slice comprises single network slice selection assistance information (S-NSSAI) or a slice/service type (SST) of the corresponding slice;
    determining, by the UE, a target slice for which a random access is triggered;
    in response to determining that identification information of the target slice is absent from the multiple pieces of random access configuration information, selecting by the UE, a common random access resource as a random access resource of the target slice; and
    performing, by the UE, a random access on the random access resource of the target slice for which the random access is triggered.

2. The method of claim 1, further comprising:
    determining the target slice for which the random access is triggered based on slice identification information provided when a non-access stratum requests an access stratum to initiate a radio resource control (RRC) connection.

3. The method of claim 1, further comprising:
    determining the target slice for which the random access is triggered based on slice identification information carried in a physical downlink control channel (PDCCH) command when the PDCCH command triggers the random access of the UE.

4. The method of claim 1, wherein the target slice is identified by one of a S-NSSAI SST.

5. A communication processing method, comprising:
    determining, by a network device, multiple pieces of random access configuration information for a plurality of slices, wherein the network device configures respective random access configuration information for each of the plurality of slices, and each random access configuration information comprises identification information of a corresponding slice and comprises a correspondence between the identification information of the corresponding slice and random access resources, the identification information of the corresponding slice comprises single network slice selection assistance information (S-NSSAI) or a slice/service type (SST) of the corresponding slice; and
    sending, by the network device, the multiple pieces of random access configuration information for the plurality of slices to a user equipment (UE) so that in a case that the identification information of a target slice is absent from the multiple pieces of random access configuration information, the UE selects a common random access resource as a random access resource of the target slice to perform a random access.

6. A user equipment (UE), comprising:
    a processor; and
    a memory storing executable instructions;
    wherein the processor is configured to perform the following:
    receiving multiple pieces of random access configuration information from a network device for a plurality of slices, wherein the network device configures respective random access configuration information for each of the plurality of slices, and wherein each random access configuration information comprises identification information of a corresponding slice and comprises a correspondence between the identification information of the corresponding slice and random access resources, the identification information of the corresponding slice comprises single network slice selection assistance information (S-NSSAI) or a slice/service type (SST) of the corresponding slice;
    determining a target slice for which a random access is triggered;
    in response to determining that identification information of the target slice is absent from the multiple pieces of random access configuration information, selecting by the UE, a common random access resource as a random access resource of the target slice; and
    performing the random access on the random access resource of the target slice for which the random access is triggered.

7. A network device, comprising:
    a processor; and
    a memory storing executable instructions;
    wherein the processor is configured to perform the communication processing method according to claim 5.

8. The UE of claim 6, wherein the processor is further configured to perform the following:
    determining the target slice for which the random access is triggered based on slice identification information provided when a non-access stratum requests an access stratum to initiate a radio resource control (RRC) connection.

9. The UE of claim 6, wherein the processor is further configured to perform the following:
    determining the target slice for which the random access is triggered based on slice identification information carried in a physical downlink control channel (PDCCH) command when the PDCCH command triggers the random access of the UE.

10. The UE of claim 6, wherein the target slice is identified by one of a S-NSSAI and a SST.

*    *    *    *    *